United States Patent [19]

Sumio

[11] 4,020,492
[45] Apr. 26, 1977

[54] HAND-WRITING TYPE RECORDING DEVICE FOR A CAMERA

[76] Inventor: Horikomi Sumio, 5-10-11, Minami Shinagawa, Shinagawa, Tokyo, Japan

[22] Filed: Feb. 20, 1976

[21] Appl. No.: 659,595

[30] Foreign Application Priority Data

Mar. 20, 1975 Japan .............................. 50-33649
Oct. 3, 1975 Japan ............................ 50-120053

[52] U.S. Cl. ........................... 346/107 R; 354/105
[51] Int. Cl.² ................... G01D 9/42; G03B 17/24
[58] Field of Search ............... 346/107 R; 354/105, 354/106; 178/18–20

[56] References Cited
UNITED STATES PATENTS

| 1,351,762 | 9/1920 | King | 354/106 |
| 1,402,833 | 1/1922 | Brown | 354/106 |
| 3,259,009 | 7/1966 | Walter | 346/107 R X |
| 3,739,697 | 6/1973 | Miyagawa | 346/107 R X |

*Primary Examiner*—George H. Miller, Jr.
*Attorney, Agent, or Firm*—Woodling, Krost, Granger & Rust

[57] ABSTRACT

A hand-writing type recording device comprising a casing having a window in the bottom, a partition plate extending horizontally within the casing to divide the interior of the casing into two chambers, a hand-writing sheet mounted on a selected portion of the upper surface of said partition plate, a resilient vertically movable carriage plate disposed below the partition plate, a lazy tong-type arm slidably mounted on the upper surface of the movable plate, an arm pivoted to one end of the extensible arm and having an upright pivot pin at the other end of the second-mentioned arm, an operation bar pivoted to the pivot pin and having writing means at the other end, a movable plate pivoted to the other end of the extensible arm, a vertically movable photoconductive means, a contact on said photoconductive means, a lamp mounted on the movable member in proximity to the photoconductive means, a second contact mounted on the movable member, a power source and electrical circuit means for connecting the lamp to and disconnecting from the power source.

8 Claims, 14 Drawing Figures

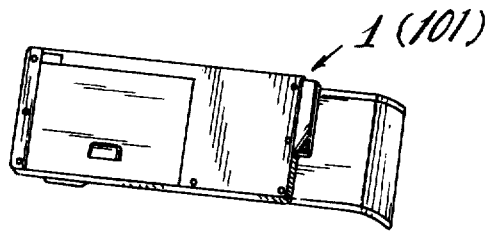
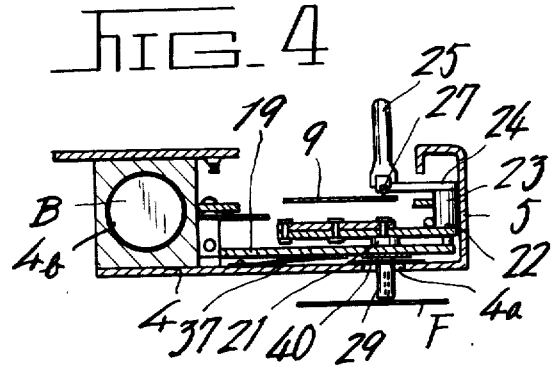
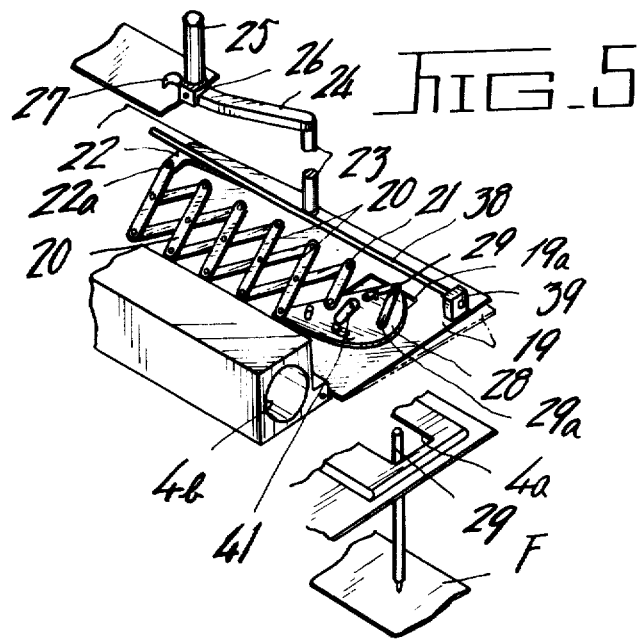

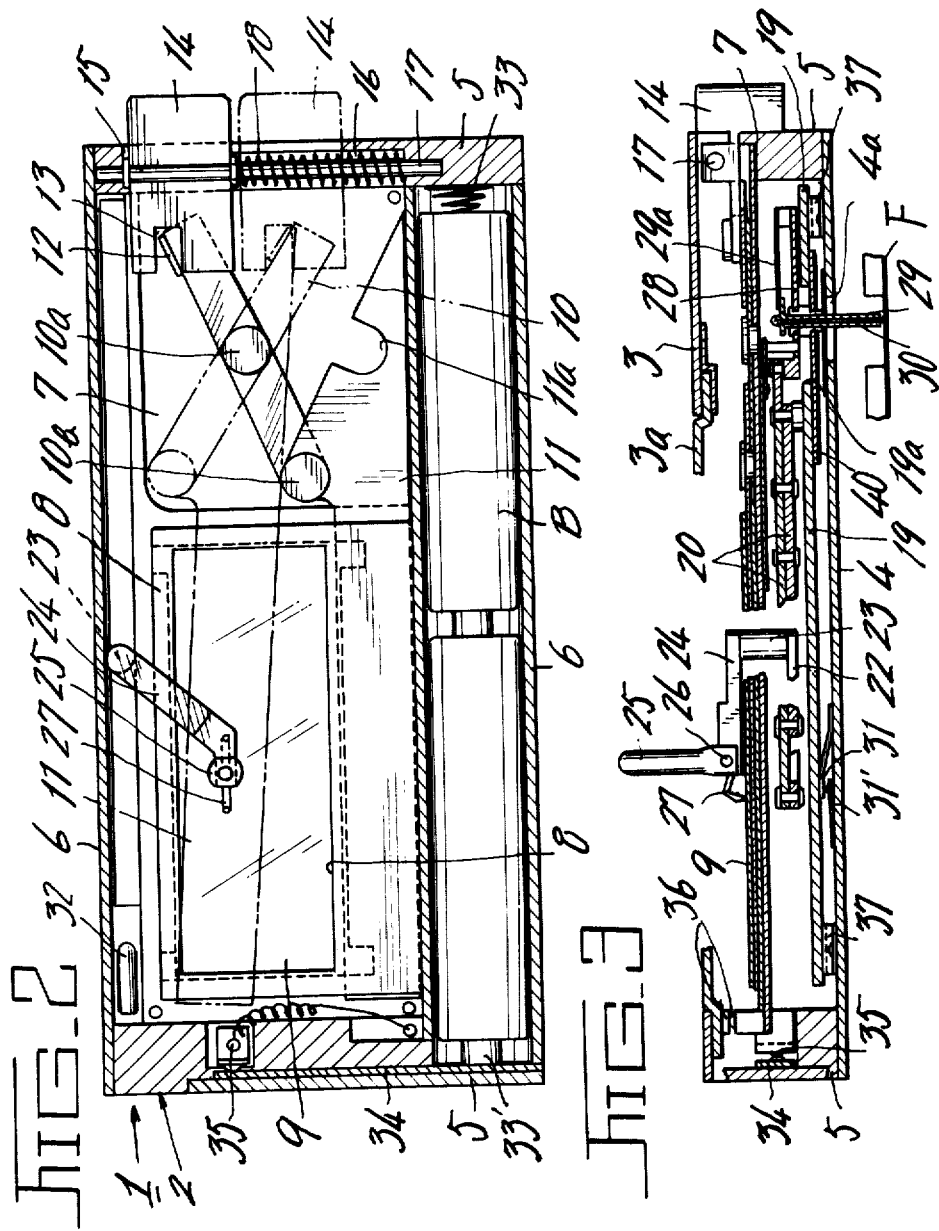

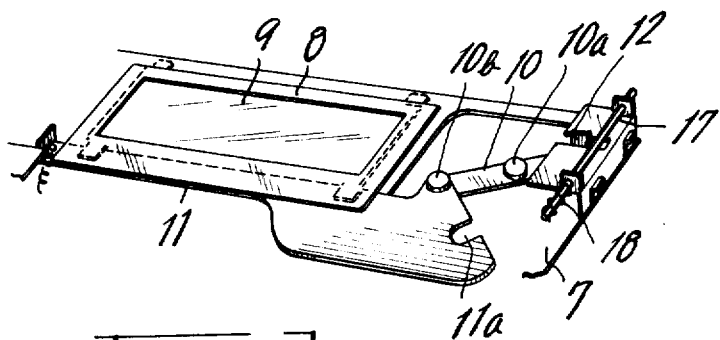
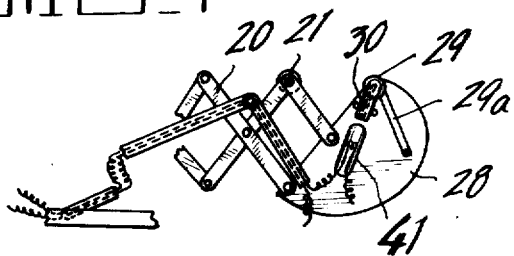
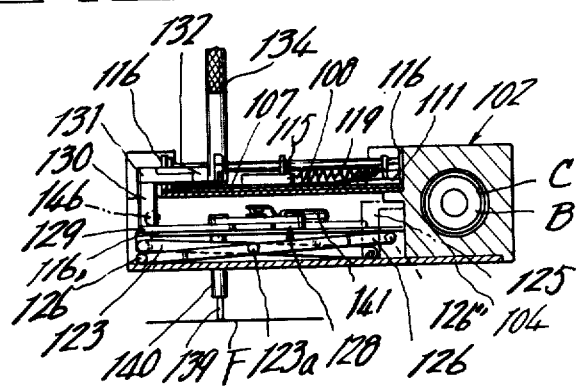

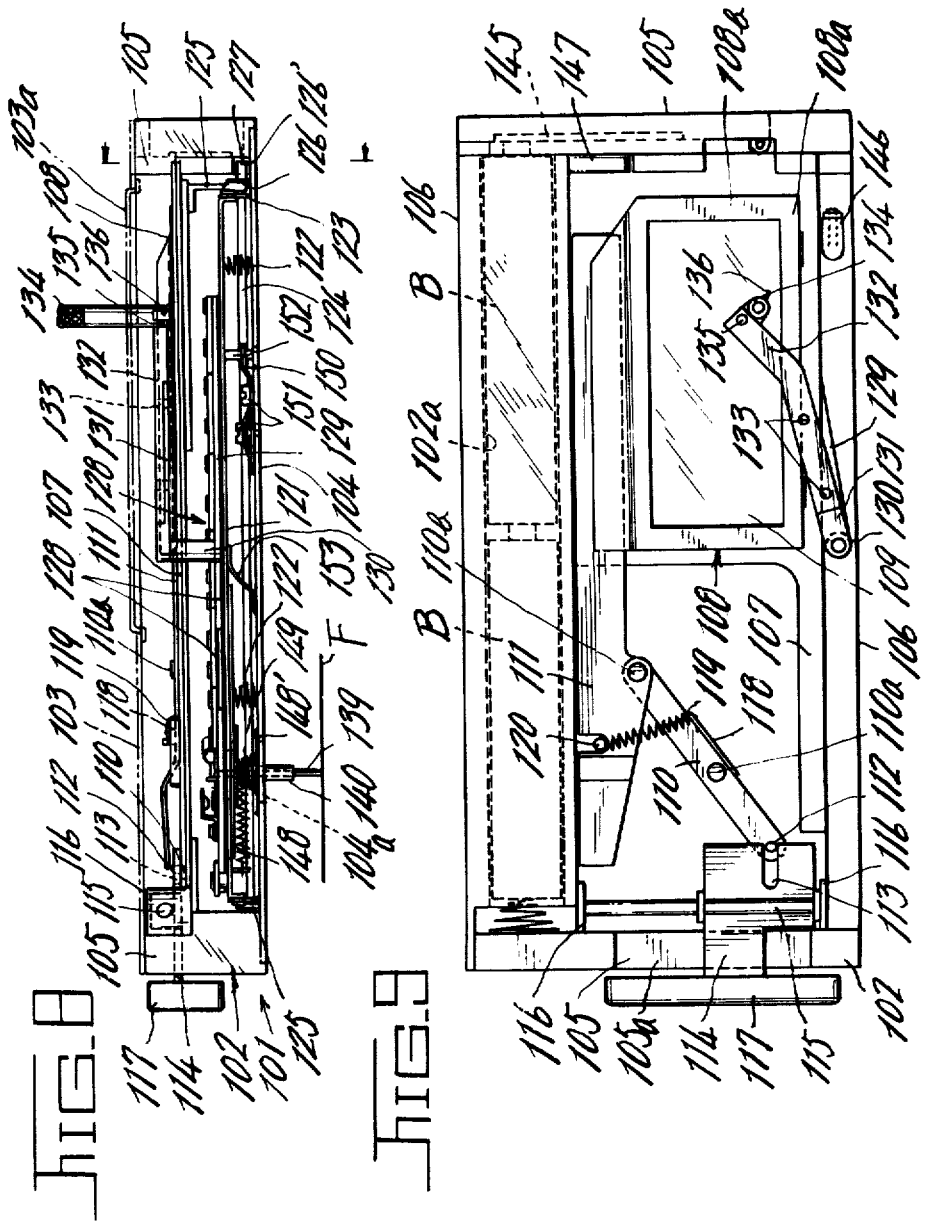

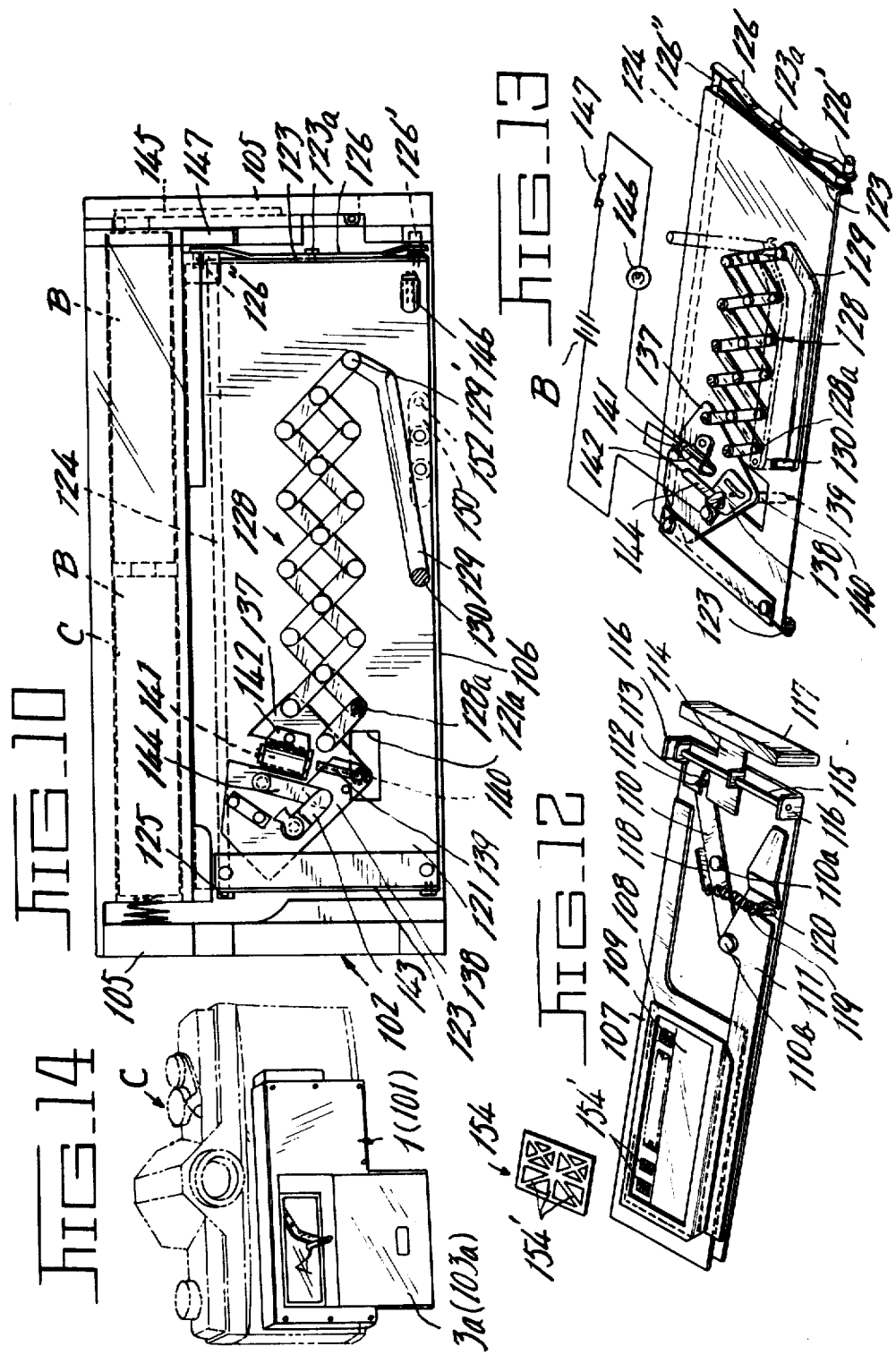

HAND-WRITING TYPE RECORDING DEVICE FOR A CAMERA

BACKGROUND OF THE INVENTION

This invention relates to a hand-writing type recording device for use in connection with a camera for photographically recording an information or informations on the film within a camera and more particularly, to a novel and improved handwriting type recording device in which an information written on the writing sheet in the device is photgraphically recorded on the film within the camera in a precise and reduced size through the optical mechanism in the device.

The inventor has previously proposed a hand-written type recording device in which when an information is hand-written on the colorless transparent writing sheet by the writing rod, the thus written information develops on the writing sheet in visible manner with the aid of the writing pressure applied on the writing sheet and the underlying colored tacky information developing sheet and at the same time, the writing pressure energizes the lamp positioned adjacent to and in opposition to the photoconductive means which transmits light rays emitted from the energized lamp to the film within a camera to photographically record the written information on the film in reduced size through two extensible arms disposed one upon another in vertically spaced relationship and each comprising a plurality of lazy tongs.

However, in the above-proposed hand-writing type recording device, the two extensible arms are arranged in vertically spaced relationship within the casing as means for reducing the size of the information being written on the writing sheet when the information is photographically recorded on the film and the holed diaphragm is positioned between the upper and lower extension arms which diaphragm transmits the writing pressure applied on the writing sheet to the switch mechanism which in turn energizes the lamp and power source positioned adjacent to the photoconductive means whereby the written information is photgraphically recorded on the film with the aid of light rays emitted from the energized lamp. And the photoconductive means is formed of a photoconductive fiber or a bundle of photoconductive fibers and positioned longitudinally and transversely of the casing between the lamp and photographing mechanism and between the photographing mechanism and display lamp. The arrangement of the dual information reduction mechanism and the positioning of the photoconductive means referred to above makes the construction of the recording device complicated and increases the size of the device. Thus, the application of the above-proposed hand-writing type device is inevitably limited to a narrow range and error easily occurs in related motion of the movable parts which results in an unclear and/or distorted photographic recording of the information. Furthermore, the above-proposed hand-writing type recording device suffers from the disadvantages that the device requires a relatively large number of assembling steps and that the production cost of the device is relatively high.

SUMMARY OF THE INVENTION

Therefore, one object of the present invention is to provide a hand-writing type recording device which can effectively eliminate the disadvantages inherent in the above-referred hand-writing type recording device.

Another object of the present invention is to provide a hand-writing type recording device which employs a single extensible arm comprising a plurality of lazy tongs to thereby simplify the information size reduction mechanism resulting in reduction of the overall size and production cost of the device.

Another object of the present invention is to provide a hand-writing type which includes a resilient carriage plate which carries a photoconductive means and is adapted to move down in response to the writing pressure applied thereon to energize the light transmission mechanism and simultaneously, causes the photoconductive means to contact the film within a camera to thereby effect photographic recording.

The above and other objects and attendant advantages of the present invention will be more readily apparent to those skilled in the art from a reading of the following detailed description in conjunction with the accompanying drawings which show preferred embodiments of the invention for illustration purpose only, but not for limiting the scope of the same in any way.

BRIEF DESCRIPTION OF THE DRAWINGS

FIG. 1 is a perspective view of the basic hand-writing type recording device constructed in accordance with the principle of the present invention;

FIG. 2 is a plan view in partial section of one embodiment of hand-writing type recording device according to the present invention showing the device with the front or top cover plate removed therefrom;

FIG. 3 is a front elevational view in section of said hand-writing type recording device of FIG. 2;

FIG. 4 is a fragmentary plan view in section of the writing rod and its associated parts of the hand-writing type recording device of FIG. 2;

FIG. 5 is a fragmentary perspective plan view showing the mechanism positioned below the partition plate within the casing of said hand-writing type recording device of FIG. 2;

FIG. 6 is a fragmentary perspective view showing the relationship between the writing sheet and erasing mechanism of said hand-writing type recording device of FIG. 2;

FIG. 7 is a fragmentary perspective view showing the photoconductive member guide tube and lamp mounted on the movable plate connected to the extensible arm in said hand-writing recording device of FIG. 2;

FIG. 8 is a front elevational view in section of another embodiment of hand-writing type recording device according to the present invention showing the device with the front or top cover removed therefrom;

FIG. 9 is a plan view of said hand-writing type recording device of FIG. 8 showing the device with the front or top cover removed therefrom;

FIG. 10 is a plan view of said hand-writing type recording device of FIG. 8 with the partition plate removed therefrom;

FIG. 11 is a cross-sectional view substantially taken along the line X — X of and as seen in the arrow direction of FIG. 8;

FIG. 12 is a fragmentary perspective view showing the writing mechanism and eraser mechanism of said hand-writing recording device of FIG. 8;

FIG. 13 is a fragmentary perspective view of the carriage plate on which an extensible arm comprising lazy tongs is mounted in said hand-writing type recording device of FIG. 8; and FIG. 14 is a perspective view which shows the manner in which the hand-writing type recording device of the invention is emloyed in conjunction with a conventional camera to photorecord an information or informations on the film within the camera.

PREFERRED EMBODIMENTS OF THE INVENTION

The present invention will be now described referring to the accompanying drawings and more particularly, to FIGS. 1 through 7 thereof in which the first embodiment of hand-writing type recording device of the invention is shown. The recording device is generally shown by reference numeral 1 and generally comprises a substantially rectangular casing 2 which includes the front wall 3 (the top wall as seen in FIG. 3), the rear wall 4 (the bottom wall as seen in FIG. 3) which opposes and extends in parallel to the front wall 3, opposite and parallel end walls 5, 5 connecting the front and rear walls 3, 4 together at their opposite ends and side walls 6 connected at the opposite ends to the opposite end walls 5, 5 respectively. The top wall 3 has a slidable cover plate 3a which moves between the open and closing positions. The bottom wall 4 is formed with an opening or window 4a in a suitable position between the opposite ends thereof and the window is adapted to be aligned with a hole (not shown) provided in the rear plate of a camera C (schematically shown in FIG. 14). A writing sheet support or partition plate 7 extends horizontally within the casing 2 dividing the interior of the casing into the upper and lower chamber and is suitably secured at the opposite end edges and one side edge to the inner surfaces of the end walls 5, 5 and one side wall 1, respectively.

A rectangular erasable writing sheet support framework 8 which includes opposite and parallel side frames and opposite and parallel end frames defining a rectangular opening therebetween is fixedly mounted on the upper surface of a selected area of the partition plate 7 (an area of the left-hand side portion of the support plate as seen in FIG. 2). A rectangular erasable writing sheet 9 which may be formed of a milk-white sheet of polypropylene, for example, extends across the opening and is suitably secured to the frames of the framework 8 under tension. A removable colored information developing plate (not shown) is disposed between the undersurface of the writing sheet 9 and the above-mentioned upper surface area of the writing sheet support or partition plate. The developing plate is formed of a sheet metal having a black paint layer (for example) applied on the upper surface and an easily separable tacky material applied on the paint layer.

A pivotal eraser operation bar 10 is pivoted in an intermediate position between the opposite ends by means of a pivot pin 10a at another selected area of the upper surface of the writing sheet support plate 7 spaced from the sheet 9 and has an elongated eraser frame 11 pivoted at one end of the bar by means of a pivot pin 10b. An ear 12 extends uprightly at one side edge of the other end portion of the operation bar 10 and is received in a notch 13 formed in the inner portion of an externally operable handle member 14 slidably received in a slot 15 in one end wall 5 (the right-hand end wall as seen in FIG. 2). An opening 16 is formed in the right-hand end wall 5 and receives a transverse guide rod 17 therein. A coiled spring 18 is disposed about the guide rod 17 for guiding the handle member 14 for movement along the rod. The eraser frame 11 is formed with a notch 11a for receiving the pivot pin 10a for the eraser operation bar 10 when the eraser frame has advanced to the erasing position underneath the writing sheet 9. A cantilever resilient vertically movable carriage plate 19 is provided within the casing 2 below the partition plate 7 and extends longitudinally of the casing. The carriage plate 19 has an opening or hole 19a in alignment with the window 4a in the casing bottom wall 4 for the purpose to be described hereinafter. An extensible arm 20 comprising lazy tongs is pivoted adjacent at one end to the carriage plate 19 by means of a pivot pin 21 for extension and retraction movement during the photorecording operation as will be described hereinafter. An extensible arm operation arm 22 is pivoted at one end to the other end of the extensible arm 20 by means of a pivot 22a point and has an upright rod 23 at the other end. The other or upper end of the rod 23 supports a connection bar 24 the other end of which pivotally supports the base end of a writing rod 25 by means of a pivot pin 26. The writing rod 25 is normally held in its rest position in which the writing rod lies substantially horizontally and in operation, the writing rod extends uprightly as seen in FIGS. 3, 4 and 5. An angled pen point 27 extends laterally from the base end of the writing rod 25 for resilient contact with the film F within the camera C (schematically shown in FIG. 14).

A movable plate 28 is connected to the first-mentioned end of the extensible arm 20 for movement together with the arm and has a substantially L-shaped photoconductive member guide tube 29 held thereon by means of a holder 29a. The upper or arm portion of the guide tube 29 is positioned on the upper surface of the movable plate 28 whereas the lower or leg portion of the tube extends through a hole (not shown) in the plate 28, the opening 19a in the carriage plate 19 and the window 4a in the casing bottom wall 4a. The guide tube 29 is held in position on the plate 28 by a holder 29a. A photoconductive member 30 which may be formed of a glass fiber or a bundle of glass fibers is guided through the guide tube 29 and the lower end of the photoconductive member 30 is exposed and adapted to resiliently contact the film F during the photorecording operation as will be described hereinbelow. Also mounted on the upper surface of the movable plate 28 in opposition to the other or upper end of the photoconductive member 30 is a lamp 41 which is adapted to be electrically connected to a battery B received in a compartment 4b formed in one of the casing end walls 5 through a switch in the form of a resilient leaf spring 31 disposed between the resilient carriage plate 19 and casing bottom wall 4. A mating contact 31' is provided on the inner surface of the casing bottom wall 4 in opposition to the switch 31. The battery B is adapted to energize or denergize a display lamp 32 in synchronization with the lamp 41 through the switch including one terminal 33 of the battery B a conductor 34 provided on the inner surface of one of the opposite end walls 5 and a contact 35 provided in the one end wall 5 in opposition to the conductor 34, the other terminal 33' of the battery and a contact 36. A pair of spaced resilient pieces 37 are disposed between the resilient carriage plate 19 and casing bottom wall 4 for resiliently upholding the carriage plate 19. A carriage plate control member 38 extends longitudinally over the cantilever carriage plate 19 along one side edge (non-supported side edge) of the plate and is suitably supported at the opposite ends in a pair of support blocks 39 (only one support block is shown) projecting uprightly from the plate 19 adjacent the opposite ends thereof for controlling the fluctuation of the cantilever carriage plate 19 under the writing pressure to be applied on the plate during the photorecording operation having the photoconductive member 30 therein move within the limitation defined by the opening 19a in the carriage plate 19. Simultaneously, the writing pressure applied on the writing rod 25 during the operation is transmitted through the writing rod 25, connection bar 24, rod 23, arm 22 and extensible arm 20 to the carriage plate 19 to thereby depress the carriage plate downwardly against the force of the resilient pieces 37. In consequence, the carriage plate 19 causes the switch 31 on the undersurface of the carriage plate 19 to contact the mating contact 31' on the inner surface of the casing bottom wall 4 to thereby energize the electrical circuit leading from the battery B to the lamp 41 and display lamp 32 to energize the lamps whereby the light rays emitted from the lamp 41 are transmitted through the photoconductive member 30 to the film F and at the same time, the user can confirm that the light rays are being transmitted through the photoconductive member 30 by means of the light rays emitted from the display lamp 32. In this way, the information being written on the writing sheet 9 is photorecorded on the film F. A hold light shielding plate 40 is provided on the undersurface of the carriage plate 19 surrounding the photoconductive member guide tube 29.

With the above-mentioned construction and arrangement of the parts of the hand-writing-type recording device as shown in FIGS. 2 through 7 inclusive, in operation, the rear or bottom wall 4 of the casing 2 is attached to the rear cover of the camera C with the hole in the camera rear cover and the window 4a in the casing bottom wall 4 in alignment with each other. Then, the slidable cover 3a for the top wall cover 3 of the casing is pulled to the open position and the writing rod 25 is erected to the operating or writing position. Thereafter, the user writes a desired information to be recorded which may comprise letters, symbols, numerals and/or pictures or any combination thereof on the writing sheet 9 by means of the pen point 27 of the writing rod 25 and while the information is being written, the information develops on the writing sheet 9 by the aid of the unerlying developing plate whereby the user can take notice of what he is writing. During the operation, the extensible arm 20 slidably extends and retracts following the movement of the writing rod 25 and more particularly, of the pen point 27 across the writing sheet 9 which in turn displaces the movable plate 28 connected to the extensible arm 20 accordingly and thus, the guide tube 29 for the photoconductive member 30 on the film F precisely conforms to that being written on the writing sheet 9, but reduced in size by means of the extensible arm 20. When the writing pressure applied on the writing rod 25 is removed therefrom after the information photorecording operation has been completed, the cantilever carriage plate 19 is pushed upwardly by the action of the resilient pieces 37 to the original upper position to separate the resilient switch 31 on the undersurface of the carriage plate from the mating contact 31' whereupon the electrical circuit is broken to deenergize the lamp 41. Simultaneously, the guide tube 29 having the photoconductive member 30 therein is also moved away from the film F to deenergize the display lamp 32 whereby the user can confirm that the photorecording operation has been completed or halted. It is to be understood that the fluctuation of the carriage plate 19 during the downward and upward movement thereof is controlled by the control member 38.

To put more in detail, each time the writing rod 17 writes a desired information or informations on the writing sheet 9, the writing pressure applied on the writing rod 25 depresses the resilient carriage plate 9 which in turn makes the electrical circuit including the switch 31, contact 31', battery B and lamps 41 and 32 and the downward movement of the resilient carriage plate 19 depresses the movable plate 28 to cause the lower end of the photoconductive member 30 to contact the film F whereby the information being written on the writing sheet 9 is photorecorded on the film F in preciseness and reduced size. And each time after the photorecording operation has been completed, the writing pressure applied on the writing rod 25 is removed therefrom to allow the carriage plate 19 to move upwardly to the original upper position together with the photoconductive member and guide piece 30, 29 by the force of the resilient pieces 37 to thereby break the electrical circuit whereby no light ray is transmitted to the photoconductive member 30.

By repeating the above procedure, a desired information or informations can be photorecorded on the film F. As mentioned hereinabove, since the colored tacky developing plate is positioned below the writing sheet 9, while the user is writing the information, the user can clearly confirm what he is writing.

When it is desired to preserve the information written on the writing sheet 9 permanently even after the photorecording operation has been completed, a detachable recording paper or rolled paper may be employed in place of the writing sheet 9 and the paper having the information or informations written thereon can be then taken out of the writing position in the device. On the other hand, when it is not desired to preserve the information or informations written on the writing sheet 9 permanently, the eraser handle member 14 is moved from the full line position to the phantasm line position (as seen in FIG. 2) along the guide rod 17 against the force of the sping 18 to pivot the eraser operation bar 10 about the pivot pin 10a from the full line position to the phantasm line position (as seen in FIG. 2) which in turn advances the eraser frame 11 to the erasing position under the writing sheet 9 to separate the underlying developing plate to erase the information written on the writing sheet 9 in the preceding photorecording operation. After the erasing operation, the handle member 14 is released to allow the member to move back along the guide rod 17 to the original position under the force of the spring 18 which in turn moves the eraser operation bar 10 and eraser frame 11 to the original position whereby the writing sheet 9 is ready for the next photorecording operation.

As clear from the foregoing description on the preferred or first embodiment of hand-writing type recording device of the invention, the information photorecording on the film F can be precisely and positively carried out by the photorecording mechanism and since the information or informations written on the writing sheet 9 may be permanently preserved or erased as desired, the hand-writing type recording device can be employed for photographically recording conditions of a patient in a roentogen photography and/or date such as the date on which such recording was made.

Referring now to FIGS. 8 through 13 inclusive of the accompanying drawings in which the second embodiment of hand-writing type recording device constructed in accordance with the present invention is illustrated. The second embodiment of hand-writing type recording device is generally shown by reference numeral 101 and generally comprises a substantially rectangular casing 102 which includes the front or top wall 103, the rear or bottom wall 104 opposite and parallel to front or the top wall (the "top" and "bottom" are as seen in FIGS. 8 and 9), a pair of opposite and parallel end walls 105, 105 and a pair of opposite and parallel side walls 106, 106 connected at the opposite ends to the adjacent ends of the opposite end walls 105, 105, respectively. A slidable cover 103a is received in the top wall 103 for movement between the open and closing positions to be described hereinbelow. The rear or bottom wall 104 is provided with an opening or window 104a adapted to be aligned with a hole (not shown) provided in the rear plate of the conventional camera C (schematically shown in FIG. 14) in which a film F on which informations are to be photographically recorded by the hand-writing type recording device of the invention is received. A writing sheet support or partition plate 107 extends horizontally within the casing 102 to divide the interior of the casing into upper and lower chambers and is suitably secured at the opposite end edges and one side edges to the inner surfaces of the end walls 105, 105 and one side wall 106, respectively.

A rectangular erasable writing sheet support framework 108 which includes opposite and parallel side frames and opposite and parallel end frames defining a rectangular opening therebetween is fixedly mounted on a selected area of the upper surface of the writing sheet support plate 107 (an area of the right-hand side portion of the support plate as seen in FIG. 8). A rectangular erasable writing sheet 109 which may be formed of a milk-white sheet of polypropylene, for example, extends across the opening and is suitably secured to the frames of the support framework 108 under tension. A removable colored information developing plate (not shown) is disposed between the undersurface of the writing sheet 109 and the above-mentioned upper surface area of the writing sheet support plate 107 and formed of a sheet metal having a black paint layer (for example) applied on the upper surface and an easily separable tacky material applied on the paint layer. A pivotal eraser operation bar 110 is pivoted in an intermediate position between the opposite ends by means of a pivot pin 110a at another selected area of the upper surface of the writing sheet support or partition plate 107 spaced from the writing sheet 109 and has an eraser frame 111 pivoted at one end of the bar 110 by means of a pivot pin 110b.

A pin 112 is secured to and extends uprightly from the other end of the pivotal eraser operation bar 110 and received in a notch 113 formed in the inner portion of a handle member 114 slidably mounted on a transverse guide rod 115 supported at the opposite ends in a pair of spaced and opposite upright brackets 116, 116 provided at the adjacent end of the writing sheet support plate 107. The handle member 114 also has an external extension extending outwardly of the adjacent casing end wall 105 carries at the extreme outer end a manual handle portion 117 and a notch 105a is formed in the adjacent casing end wall 105 to allow the handle member 114 to slidably move along the guide rod 115 whereby when the manual handle portion 117 is manipulated to cause the handle member 114 to slidably move along the guide rod 115 in one direction to advance the eraser frame 111 to the position underneath of the erasable writing sheet 109 (assuming that a desired information has been developed on the sheet 109 by the preceding photographic recording operation as will be described hereinafter) through the pivotal bar 110 to separate the erasable writing sheet 109 from the underlying colored tacky information developing plate so as to erase the information written and developed on the writing sheet 109. It will be readily apparent to those skilled in the art that in order to retract the eraser frame 111 from the erasing position below the writing sheet 109 after the erasing operation, it is only necessary to move the handle member 117 in the other or opposite direction.

The pivotal bar 110 is further provided at one side edge with an upright ear 118 in an intermediate position between the opposite ends of the bar and one end of a tension spring 119 is anchored to the ear 118 whereas the other end of the spring is anchored to a pin 120 which extends uprightly from the upper surface of the writing sheet support or partition plate 107 for normally urging the eraser frame 111 to its non-operative or retracted position.

Provided within the casing 102 below the writing sheet support or partition plate 107 is a vertically movable carriage plate 121 which is normally urged upwardly by compressed upholding springs 122 which are provided within the lower chamber of the casing between the carriage plate 121 and the bottom wall 104 of the casing 102. The carriage plate 121 has a rectangular opening 121a adjacent to one end for the purpose to be described hereinafter. A pair of transverse arms 123, 123 are pivoted at one end to the opposite ends of the carriage plate 121 and a longitudinally extending connection rod 124 extends below the carriage plate 121 along one side edge of the plate and is connected at the opposite end portions to the other ends of the arms 123. The extreme ends of the connection rod 124 extend beyond the associated ends of the arms 123, 123 and journalled in support pieces 125, 125 (only one support piece 125 is shown) extending uprightly from the inner surface of the casing bottom wall 104. One of the arms 123 (the right-hand arm as seen in FIG. 10) has an auxiliary arm 126 pivoted at 123a and one end of the auxiliary arm has an outwardly projecting pin 126' which is received in a notch 127 formed in one or the right-hand end wall 105 of the casing 102 whereas the other end of the auxiliary arm 126 has an inwardly extending pin 126" which abuts against the undersurface of the carriage plate 121 so that the arms 123, 123 and auxiliary arm 126 cooperate with each other in maintaining the carriage plate 121 in balanced position during the vertical movement of the plate 121.

An extensible arm 128 comprising lazy tongs is provided within the lower casing chamber and pivoted at the base end (the left-hand end as seen in FIG. 10) to the upper surface of the carriage plate 121 adjacent to one end of the plate (the left-hand end as seen in FIG. 10) at 128a and the other or front end of the extensible arm pivotally supports one end of a substantially L-shaped arm 129 at 129' whereas the other end of the L-shaped arm has a pivot pin 130 extending uprightly therefrom. The upper end of the pivot pin 130 pivotally supports one end of an arm 131 the other end portion of which has an extensible arm operation bar 132 detachably secured thereto by means of screws 133 which operation bar in turn pivotally supports at the other end a writing rod 134 by means of a pivot pin 135 for movement between rest and erected positions.

The writing rod 134 has a pen point 136 at the free end and the tip end of the pen point is positioned just above the pivot point 129' for the arm 129 at the front end of the expansible arm 128. A movable plate 137 is connected to the base end of the expansible arm 128 for movement together with the arm by connecting one end of two of the lazy tongs of the expansible arm 128 at the end. A photoconductive member support plate 138 is freely supported on the upper surface of the movable plate 137 and supports a photocondutive member 139 thereon and the photoconductive member 139 is formed of a glass fiber or a bundle of glass fibers and has a substantially L-shape with the upper or horizontal portion secured to the upper surface of the plate 138 and the lower or vertical portion extending into a guide tube 140 which is secured to and depends from the undersurface of the movable plate 137. The photoconductive member is exposed at the lower end. The guide tube 140 freely extends through the opening 121a in the carriage plate 121.

Also mounted on the upper surface of the movable plate 137 in opposition to the photocondutive member 139 is a lamp 141 which is embraced by a holding bracket 142 which is in turn secured to the upper surface of the movable plate 137. The lamp 141 is adapted to be electrically connected at one end through a contact 143 mounted on the upper surface of the plate 138, another contact 144 mounted on the upper surface of the movable plate 137 and hanging over the contact 143 to a battery B as the power surcace housed in a compartment 102a defined in the casing 102 at the other end through a switch 145, a display lamp 146 mounted on the inner surface of one end wall 105 of the casing 102 to the battery B so that the display lamp 146 can be energized in synchronization with the photorecording mechanism including the lamp 141 and photoconductive member 139. The photoconductive member 139 is so guided through the guide tube 140 that when the carriage plate 121 moves downwardly under the writing pressure applied during the photorecording operation, the lower end of the photoconductive member 139 resiliently contacts the film F.

In order to prevent the leakage of light through the window or hole 104a about the guide tube 140 in the casing bottom wall 104, a pair of parallel holed light shielding plates 148, 148' are held on the undersurface of the carriage plate 121 and the inner surface of the casing bottom wall 104 surrounding the guide tube 140 in the opening 121a in the former and the window 106 in the latter, respectively and a coiled spring 149 is disposed under tension between the upper and lower light shielding plates 148, 148' surroundng the guide tube 140 to urge the plates against the carriage plate and casing bottom wall, respectively and allow the plates to slidably move together with the guide tube 140 along the carriage plate and casing bottom wall within the limination defined by the opening 121a and window 106.

A holed bent guide piece 150 is secured to the inner surface of the casing bottom wall 104 by means of screws 151 and receives a pin 152 extending downwardly from the undersurface of the carriage plate 121 to uphold the carriage plate in cooperation with the springs 122. The lower end of the pin 152 terminates short of the inner surface of the bottom wall 104. In order to reinforce the upholding force for the carriage plate 121, a bent upholding plate in the form of a leaf spring 153 is disposed between the carriage plate 121 and the casing bottom wall 105. A character pattern support plate 154 is optionally provided on the upper surface of the writing sheet 109 along one of the side frames of the framework 108 and supports a plurality of spaced character patters 154' thereon. The character patters 154' each has grooves which define alphabetic letters, for example.

With the above-mentioned construction and arrangement of the parts of the hand-writing type recording devices as shown in FIGS. 8 through 13 inclusive, in operation, the rear or bottom wall 104 of the casing 102 is attached to the rear cover of the camera C with the hole in the rear cover of the camera and the window 104a in the casing 102 of the device 101 in alignment with each other. Then, the slidable cover 103a for the front or top wall 103 of the casing is pulled to the open position and the writing rod 134 is erected to the operating or writing position. Thereafter, the user writes a desired information to be recorded which may comprise letters, symbols, numerals and/or pictures or any combination thereof on the writing sheet 109 or along grooves in the patterns 154' by means of the pen point 136 of the writing rod 134 and while the information is being written, the information develops on the writing sheet 109 by the aid of the underlying developing plate whereby the user can take notice of what he is writing. During the operation, the extensible arm 128 slidably extends and retracts following the movement of the writing rod 134 and more particularly, of the pen point 136 across the writing sheet 109 which in turn displaces the movable plate 137 which is connected to the base end of the extensible arm 128 accordingly and thus, the guide tube 140 mounted on the movable plate 137 and having the photocondutive member 138 therein moves within the opening 121a in the carriage plate 121. Simultaneously, the writing pressure applied on the writing rod 134 during the operation is transmitted through the extensible arm operation bar 132, arm 131, arm 129 and extensible arm 128 to the carriage plate 121 to thereby depress the carriage plate 121 downwardly against the force of the springs 122 and bent plate 153. When depressed, the carriage plate 121 moves maintaining its horizontal position by means of the arms 123, 123 at the opposite ends of the carriage plate 121 and the auxiliary arm 126 connected to one of the arms 123 and in consequence, the photocondutive member 139 received in the guide tube 140 secured to the movable plate 137 on the carriage plate 121 descends down until the tip end of the conductive member 139 resiliently contacts the film F within the camera C and at the same time, the contact 144 on the movable plate 137 contacts the opposite contact 143 on the support plate 138 so as to establish the electrical circuit of the writing type recording device to thereby energize the lamp 141 mounted on the movable plate 137 and included in the electrical circuit and also energize the display lamp 146 mounted on the casing 102 and included in the same electrical circuit to give an indication to the user that the photoconductive member 138 has contacted the film F and accordingly, the photorecording is made on the film F.

The light rays emitted from the lamp 141 are guided through the photoconductive member 139 to the pen point 136 of the writing rod 134 and thus, the written information is photorecorded on the film F by the utilization of the light rays conducted through the photoconductive member 139. When the writing pressure is removed from the writing rod 134 after the photorecording operation, the carriage plate 121 is pushed upwardly by the springs 122, 153 and the bent plate 153 to separate the photoconductive member 139 from the film F to allow the movable plate 137 to return to its original upper position whereby the contact 144 on the movable plate 137 is separated from the opposite contact 143 on the plate 138 to thereby deenergize the electrical circuit. Thus, upon the deenergization of the electrical circuit, the lamps 141 and 146 are also deenergized to give an indication to the user that the information photorecording operation has completed or paused.

To put in more detail, each time the writing rod 134 writes a desired information on the writing sheet 109 or along the grooves in the patterns 154' on the pattern support plate 154, the writing pressure on the writing rod 134 energizes the electrical circuit to photorecord the information precisely corresponding to that being written on the writing sheet 109 through the photoconductive member 139 on the film F in reduced size. The size reduction of the information to be recorded on the film F is achieved by means of the extension and retraction movement of lazy tongs of the extensible arm 128 which follows the movement of the writing rod 134 during the recording operation. On the other hand, when the writing pressure by the writing rod is removed from the film F after the recording operation, the electrical circuit is deenergized and the recording operation ceases. By repeating the above-mentioned writing pressure application and removal cycle, a desired number of informations precisely corresponding to those written on the writing sheet 109 can be in succession photographically recorded on the film. During the photorecording operation, the carriage plate 121 may tend to warp by a substantial degree under the writing pressure, but such warping of the carriage plate 121 can be effectively absorbed by the arms 123, 123 and 126 to thereby allow the carriage plate 121 to descend maintaining its substantial horizontal position to ensure proper and precise photorecording.

When it is desired to preserve the written information or informations on the writing sheet 109 permanently even after the photorecording operation has been completed, a recording or rolled paper may be employed in place of the writing sheet 109 and after a desired information or informations have been written on the paper, the paper bearing such an information or informations is rolled up and preserved. When it is not desired to permanently preserve the written information or informations on the writing sheet 109 after the recording operation, the handle member 114 mounted on one of the end walls 105 is moved along the guide rod 115 in one direction by mainpulating the handle portion 117 to pivot the pivotal bar 110 connected to the handle member 114 about the pivot 110a against the force of the spring 120 so as to advance the eraser frame 111 to the position below the writing sheet 109 to separate the sheet from the underlying colored information developing sheet (not shown) to thereby erase the information or informations written on the writing sheet 109 in the preceding photorecording operation. Upon the erasing of the information or informations, the operation member 114 is released whereupon the spring 120 anchored to the bar 110 and eraser frame 111 urges the pivotal bar 110 and handle member 114 in the other or opposite direction in unison to the original position whereby the writing sheet 109 is ready for the next photorecording operation.

As clear from the foregoing description on the embodiment of FIGS. 8 through 13 inclusive, the information or informations being written on the writing sheet 109 can be precisely and positively photographically recorded on the film F without shear and/or obscure through the action of the photocondutive member 139 by moving the carriage plate 121 down while maintaining the carriage plate in its substantially horizontal position with the arms 123, 123 and auxiliary arm 126 and the thus photographically recorded information or informations are free of shear and/or obscure. Furthermore, when the photoconductive member 138 contacts the film F, the lamp 141 and display lamp 146 in the same electrical circuit are simultaneously energized to thereby enable the user to observe the photorecording operation being performed externally and since the two lamps are simultaneously energized only when the photoconductive member 138 contacts the film F, the diffusition of light rays emitted from the lamp 141 can be prevented. Furthermore, when the film F is rolled up after the film has been photorecorded an information or informations thereon, the film can be protected from being scratched by the pen point 136 of the writing rod 134. In addition, since the information or informations written on the writing sheet may be repeatedly erased and preserved as desired, the hand-writing type recording device can be employed for photographically recording conditions of a patient in a roentogen photography and/or data such as the date on which such recording was made.

Finally, since the device includes the single extensible arm in place of the dual extensible arm system as employed in the previously proposed recording device referred to hereinabove and the movable plate is connected to the base end of the extensible arm and the lamp is positioned adjacent and opposite to the photoconductive member, the device can be constructed in compact, at less expense and simply.

It is to be understood that variations and modifications of the invention may be made without departing from the scope of the invention. It is also to be understood that the scope of the invention is not to be interpreted as limited to the specific embodiments disclosed herein, but only in accordance with the appended claims read in the light of the foregoing desclosure.

What is claimed is:

1. A hand-writing type recording device for use in conjunction with a camera having a hole in the rear plate comprising a rectangular casing having front, rear, end and side walls, said rear wall having a window adapted to be aligned with said hole in the rear plate of the camera, a horizontal partition plate extending to the longitudinal and transverse directions within said casing, information support means secured to the upper surface of said partition plate at a selected area thereof, hand-writing means disposed above said information support means and having a portion contacting the information support means, erasing means pivoted to the upper surface of said partition plate at another selected area thereof for erasing said information supported on the information support means, a resiliently supported carriage plate positioned below said partition plate for resilient vertical movement, information size reduction means pivoted at one end to said hand-writing means and supporting at the other end optical recording means, a display lamp mounted on one of said walls of the casing and electrical circuit means for synchronistrically energizing and deenergizing said optical recording means and display lamp.

2. The hand-writing type recording device as set forth in claim 1, in which said information support means includes a rectangular framework secured to said selected area of the partition plate and defining an opening therein, a milk-white synethetic resin sheet extending and supported in said opening of the framework under tension and an underlying information developing plate positioned in contact with the undersurface of said synthetic resin sheet and including a black paint layer on the upper surface and a tacky material layer applied on said paint layer.

3. The hand-writing type recording device as set forth in claim 1, in which said erasing means comprises an eraser operation bar pivoted in an intermediate position between the opposite ends thereof to an another selected area of said upper surface of the partition plate, an eraser frame pivoted at one end to one end of said operation bar for movement between a first position in which said eraser frame advances between said synthetic resin sheet and information developing plate to separate them from each other and a second position in which the eraser frame retracts from between said synthetic resin sheet and information developing plate and a spring-loaded handle member operatively connected to the other end of said operation bar and guided along a guide means provided in said casing.

4. The hand-writing type recording device as set forth in claim 1, in which said carriage plate has an opening in alignment with said window in the casing rear wall.

5. The hand-writing type recording device as set forth in claim 1, in which said information size reduction means comprises an extensible arm having a plurality of lazy tongs one of which is pivoted to said hand-writing means and another one of which supports a plate movable with the extensible arm and said optical recording means is supported on said movable plate.

6. The hand-writing type recording device as set forth in claim 1, in which said optical recording means comprises a recording light lamp mounted on said movable plate, a photoconductive member guide means a portion of which is mounted on said movable plate in opposition and adjacent to said recording light lamp and the rest of which suspends from the undersurface of said carriage plate and extends through said aligned opening and window in the carriage plate and casing rear wall and a photoconductive member in the form of a glass fiber or a bundle of glass fibers guided through said photoconductive member guide means.

7. The hand-writing type recording device as set forth in claim 1, in which said hand-writing means comprises a writing rod pivoted at the base end to one end of a connecting bar and having pen point extending from said base end at an angle thereto, a rod connected at one end to the other end of said bar and an arm connected at one end to the other end of said rod and pivoted at the other end to said extensible arm.

8. The hand-writing type recording device as set forth in claim 1, in which at least one light shielding means is provided on the undersurface of said carriage plate surrounding a portion of said photoconductive member guide means below said carriage plate.

* * * * *